US008370521B2

(12) United States Patent
Lamba et al.

(10) Patent No.: US 8,370,521 B2
(45) Date of Patent: Feb. 5, 2013

(54) RELIABLE DATA MESSAGE EXCHANGE

(75) Inventors: Vikas Lamba, Bangalore (IN); Ramprasadh Kothandaraman, Bangalore (IN)

(73) Assignee: SAP AG, Walldorf (DE)

( * ) Notice: Subject to any disclaimer, the term of this patent is extended or adjusted under 35 U.S.C. 154(b) by 343 days.

(21) Appl. No.: 12/844,733

(22) Filed: Jul. 27, 2010

(65) Prior Publication Data

US 2012/0030369 A1    Feb. 2, 2012

(51) Int. Cl.
  *G06F 15/16*   (2006.01)
  *H04J 1/16*   (2006.01)
(52) U.S. Cl. ........ 709/234; 709/237; 709/232; 709/226; 709/236; 705/2; 705/39; 370/230; 370/390; 370/473; 370/462; 370/400
(58) Field of Classification Search .......... 709/232–234, 709/237, 226, 236
  See application file for complete search history.

(56) References Cited

U.S. PATENT DOCUMENTS

| | | | | |
|---|---|---|---|---|
| 4,914,653 | A * | 4/1990 | Bishop et al. | 370/462 |
| 6,507,562 | B1 * | 1/2003 | Kadansky et al. | 370/216 |
| 6,912,220 | B2 * | 6/2005 | Azuma et al. | 370/395.2 |
| 7,385,978 | B1 * | 6/2008 | Yang et al. | 370/390 |
| 8,107,989 | B2 * | 1/2012 | Budampati et al. | 455/522 |
| 2008/0307056 | A1 | 12/2008 | Videlov | |
| 2010/0315958 | A1 * | 12/2010 | Luo et al. | 370/248 |
| 2011/0153862 | A1 * | 6/2011 | Roosta et al. | 709/234 |
| 2012/0030369 | A1 * | 2/2012 | Lamba et al. | 709/234 |

OTHER PUBLICATIONS

Wide Web Consortium (W3C) (MIT, ERCIM, Keio); Web Services Architecture: W3C Working Group Note Feb. 11, 2004; Wide Web Consortium (W3C) ( MIT, ERCIM, Keio); pp. 98 (http://www.w3.org/TR/ws-arch/wsa.pdf).
OASIS; Web Services Reliable Messaging TC WS-Reliability 1.1: OASIS Standard, Nov. 15, 2004; OASIS Open 2003-2004; pp. 72 (http://docs.oasis-open.org/wsrm/ws-reliability/v1.1/wsrm-ws_reliability-1.1-spec-os.pdf).
Don Box et al.; Web Services Eventing (WS-Eventing): W3C Member Submission Mar. 15, 2006; BEA Systems Inc., Computer Associates International Inc., International Business Machines Corporation, Microsoft Corporation, Inc, and TIBCO Software Inc.; 2004-2006 (USA) pp. 20 (http://www.w3.org/Submission/WS-Eventing/).

* cited by examiner

*Primary Examiner* — Jude Jean Gilles (57) ABSTRACT

Various embodiments of systems and methods for data message exchange in a client server network are described herein. In various embodiments, a client and a server network may implement a data message protocol for message exchanges. A method of an embodiment ensures message delivery, acknowledge message delivery, message delivery in a specific order, resending of lost data messages, and the like. In various embodiments, such data exchange may optimize data transmission and resource consumption in a client server network. A server can store data messages in a buffer and resend them only when requested by the client, as in the case of lost or out of sequence data message. A client with limited storage space need not concern itself with storing data messages and processing them at a later point in time. Furthermore, a client may optimize data transmission by acknowledging bulk data messages, rather than acknowledging them individually.

20 Claims, 9 Drawing Sheets

RELIABLE DATA MESSAGE EXCHANGE

TECHNICAL FIELD

The field relates generally to communication using reliable data messages, and, more specifically, to a reliable exchange of data messages in a client server network.

BACKGROUND

With the increasing usage of mobile devices, data communication and transmission between a client and server has evolved. As smart phones have increased in popularity due to their capabilities, users may wish to use them to the fullest potential. Mobile devices allow the possibility to perform job responsibilities remotely through network communication. This requires a seamless and reliable data connection between two working entities. An average business user, for example, may wish to update account information or even publish sales data on their Customer Relationship Management (CRM) system from their mobile device. In order for this to be achieved, one could simply install an enterprise application onto their mobile device and connect to their server so that they may perform the task at hand.

Communication and data transmission is done through a client-server network model. The overall structure is divided in two working entities. A client may be considered a service requester (also referred to as "subscriber"), and a server may be considered a service provider (also referred to as "publisher"). Data messages are constantly being exchanged between the client (e.g., a mobile device) and the server as information is being received, processed, and then sent from both ends of the communication channel. Such data messages may require guaranteed delivery or delivery in a specific order. Any number of requirements may be imposed on a client-server communication with messages to achieve efficiency, accuracy, and quality of service.

SUMMARY

Various embodiments of systems and methods for reliable data message exchange are described herein.

These and other benefits and features of embodiments of the invention will be apparent upon consideration of the following detailed description of preferred embodiments thereof, presented in connection with the following drawings.

In various embodiments, a client server network is presented. In various embodiments, the client server network may implement a reliable data message exchange protocol for exchanging business data between a client and a server using data messages.

In various embodiments, a method is presented. In various embodiments, the method may implement a reliable data message exchange protocol for message communication between a client and a server.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for reliable data message exchange are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In various embodiments, a communication using messages may be implemented. Further, one or more techniques may be used to ensure message delivery, acknowledge message delivery, ensure message delivery in a specific order, and others. Such techniques may optimize data exchange and resource consumption.

In a client server network, a client may be a desktop, laptop, mobile device, mobile telephone, and the like. A server may be a device designated to provide services to other devices on the network. Both a client and a server may send and receive messages. In a data communication using messages, a publish-subscribe model may be implemented, where one or more devices subscribe to a publisher. When the publisher publishes messages, one or more devices on the network receive such messages. In various embodiments, the roles of publisher and subscriber may alternate. For example, a server acting as a publisher may publish messages and one or more subscribers (e.g., desktops, mobile devices) acting as subscribers may receive the messages. If a device on the network needs to send data back to the server or to another device on the network, that device would act as a publisher, while the other devices may act as subscribers. In such a client server network, there may be business scenarios in which one or more quality of service measures require messages to be delivered reliably, in a specific order, or in specific ranges. From the perspective of a mobile device, such quality requirements may impose additional difficulties. For example, a mobile device has limited battery life, thus processing loads may need to be managed to conserve battery life. Also, a mobile device may lose network coverage at times. Thus, if some messages are lost, a mobile device may have a mechanism to notify the sender (e.g., server) which messages are received and which messages should be resent.

In various embodiments, data message exchange may be implemented using web services. In various embodiments, reliable messaging may be implemented to allow data messages to be reliably delivered between distributed applications in case of software component, system, or network failures. To accomplish this, the application source sends a data message to the reliable messaging source. The reliable messaging source transmits the message to the reliable messaging destination and then it delivers it to the application destination.

In various embodiments, piggybacking may be a technique used to attach an acknowledgement, operations, or other form of data to another piece of data. In various embodiments, piggybacking may be used in message communication to attach an acknowledgement, operations, or other form of data to a message that may also include data, business data, or other useful information. Thus, administrative-type data such as, but not limited to, control information, status information, and others, may be transmitted in the same messages as regular data. For example, if a sender is required to acknowledge receipt of received messages, it piggybacks this acknowledgement to a message that is created for the purpose of updating or manipulating business object data rather than sending a message meant for acknowledgement only.

In various embodiments, a sliding window may be a technique to limit the maximum number of message that may be in use at any given time. The sliding window size may be defined during registration between a client and a server. For example, the sliding window size may specify a maximum number of messages to send out before receiving an acknowledgement for the previously sent out messages. In other embodiments, the sliding window size may specify a number of messages to be stored in a buffer.

In various embodiments, acknowledgement receipts may be used. Acknowledgement receipts may be represented as values and may be piggybacked to a data message. Acknowledgement receipts may indicate a successfully received data messages, a successfully received number of messages, an out of sequence message, a lost message, and others. Thus, messages may be delivered in a specific order. For example, if an out of sequence message is received, it may be ignored and the sender may be notified via an acknowledgement receipt that another message is expected. In various embodiments, an acknowledgement receipt may be requested or sent out in the following manner. If for example, a client is out of range and has not sent out an acknowledgment receipt to the server, the server may send out a request asking the client to send out the current delivery status of the last received messages. This may also be performed by the client, in which the client may send out a request asking the server for the status of the messages that were received. In addition to status requests, a client may choose to implement a time based (e.g. every 30 seconds) or message based (e.g. every 20 messages) event to send out acknowledgment receipts.

In various embodiments, in order delivery is a procedure to guarantee each data message is processed in the order that they are sent. A gap in the message traffic may prevent future messages from being delivered. This ensures that missing messages are resent and delivered, therefore eliminating out of sequence delivery of data messages.

Figure 1:
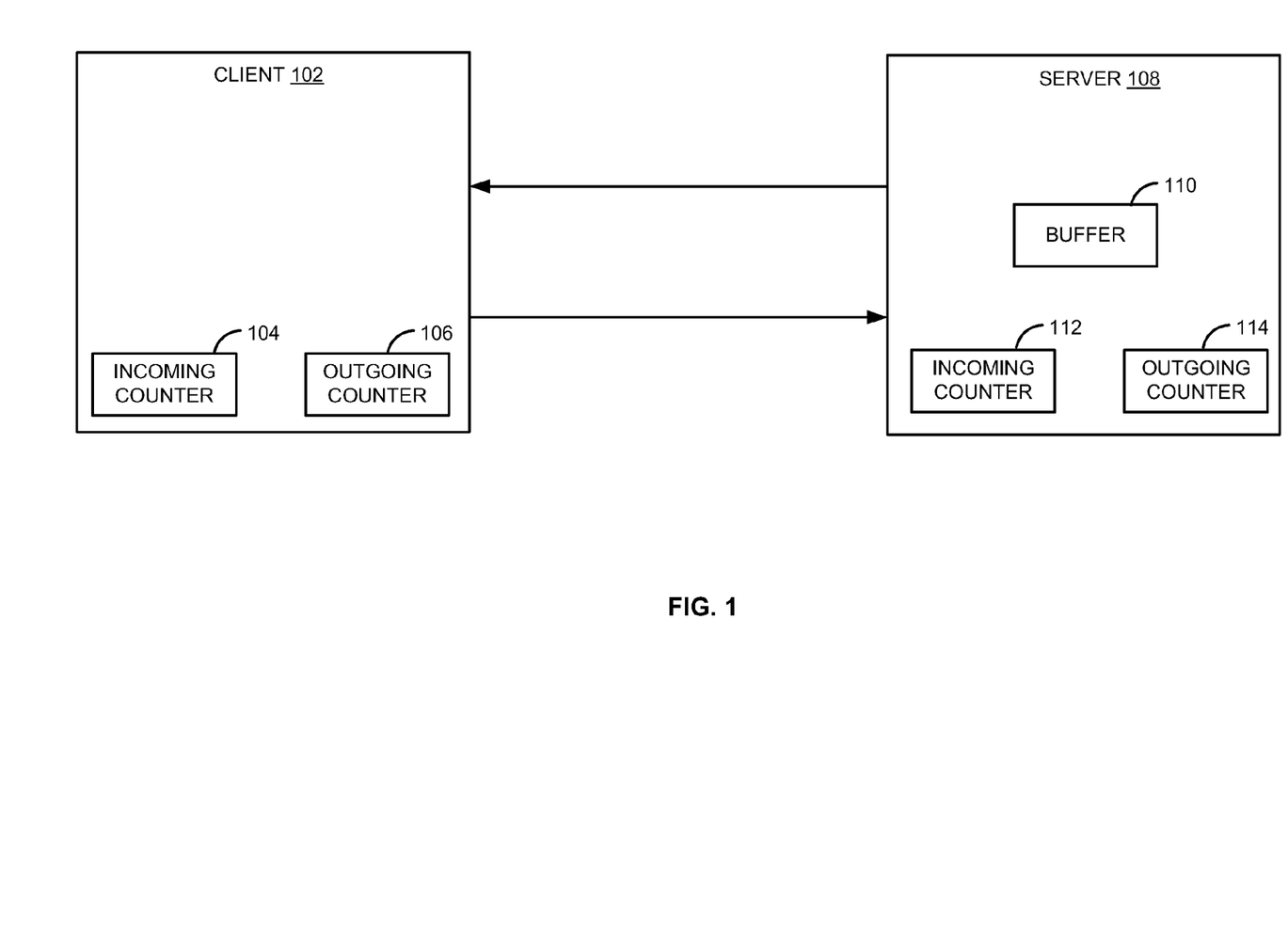
FIG. 1 is a block diagram illustrating a system for reliable data message exchange between a client and a server according to various embodiments.

FIG. 1 is a block diagram illustrating a system for reliable messaging between a client and a server according to various embodiments. Referring to FIG. 1, a client 102 and a server 108 may communicate using data messages. A client and a server may create two counters to track data message exchanges. The incoming counters 104 and 112 track incoming data messages, while the outgoing counters 106 and 114 track outgoing data messages. The incoming counter is used to store the value of the next expected message from the sender. The outgoing counter is a sequential number that is assigned by the sender. It is incremented and used to set the value of the message that is to be sent. Both counters serve as a mechanism for determining whether to accept, reject, or ignore a data message. In addition to the counters, the server has a buffer 110. The buffer is used to store copies of data messages. Such copies may be used to resend one or more data messages in case of a lost or out of sequence data message. If a data message has been received successfully then the server will delete the copied data messages from the buffer. Otherwise, it will keep a copy in case a data message needs to be resent.

Figure 2:
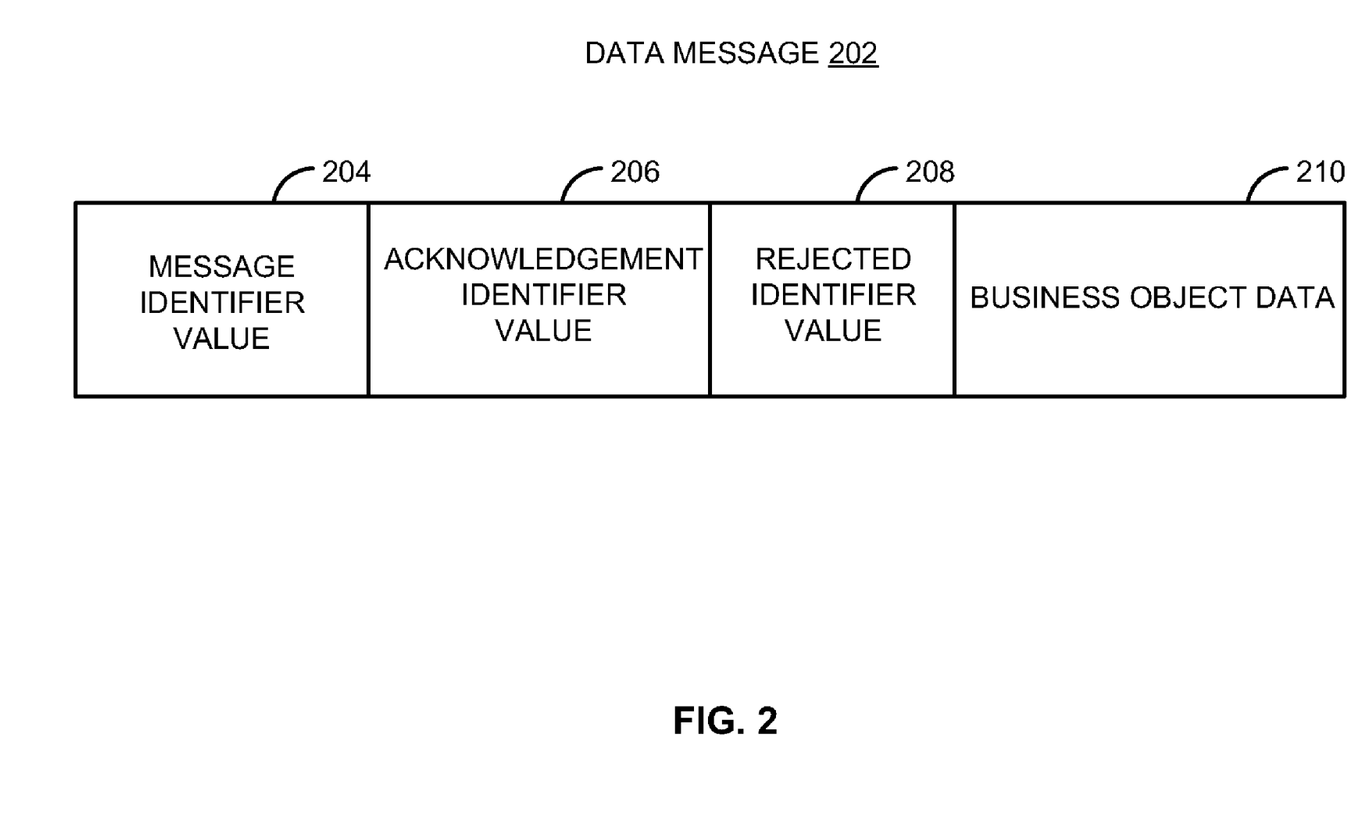
FIG. 2 is a block diagram illustrating a data message for a system for reliable data message exchange between a client and a server according to various embodiments.

FIG. 2 is a block diagram illustrating the structure of a data message for a system for reliable data message exchange between a client and a server according to various embodiments. A data message 202 may have one or more of the following elements. A message identifier value 204. If the client sends a data message, the message identifier is the value of each message that is sent out to the server. If the server is sending the data message then this element is the value of each outgoing data message. The acknowledgement identifier value 206 is the same for both client and server and is used to send an acknowledgement receipt of last successfully received data message. The rejected identifier value 208 indicates the value of the data message that is lost or out of sequence. The business object data 210 is the element in the data message that is used as a placeholder to store business information (e.g. account data, sales data).

Figure 3A:
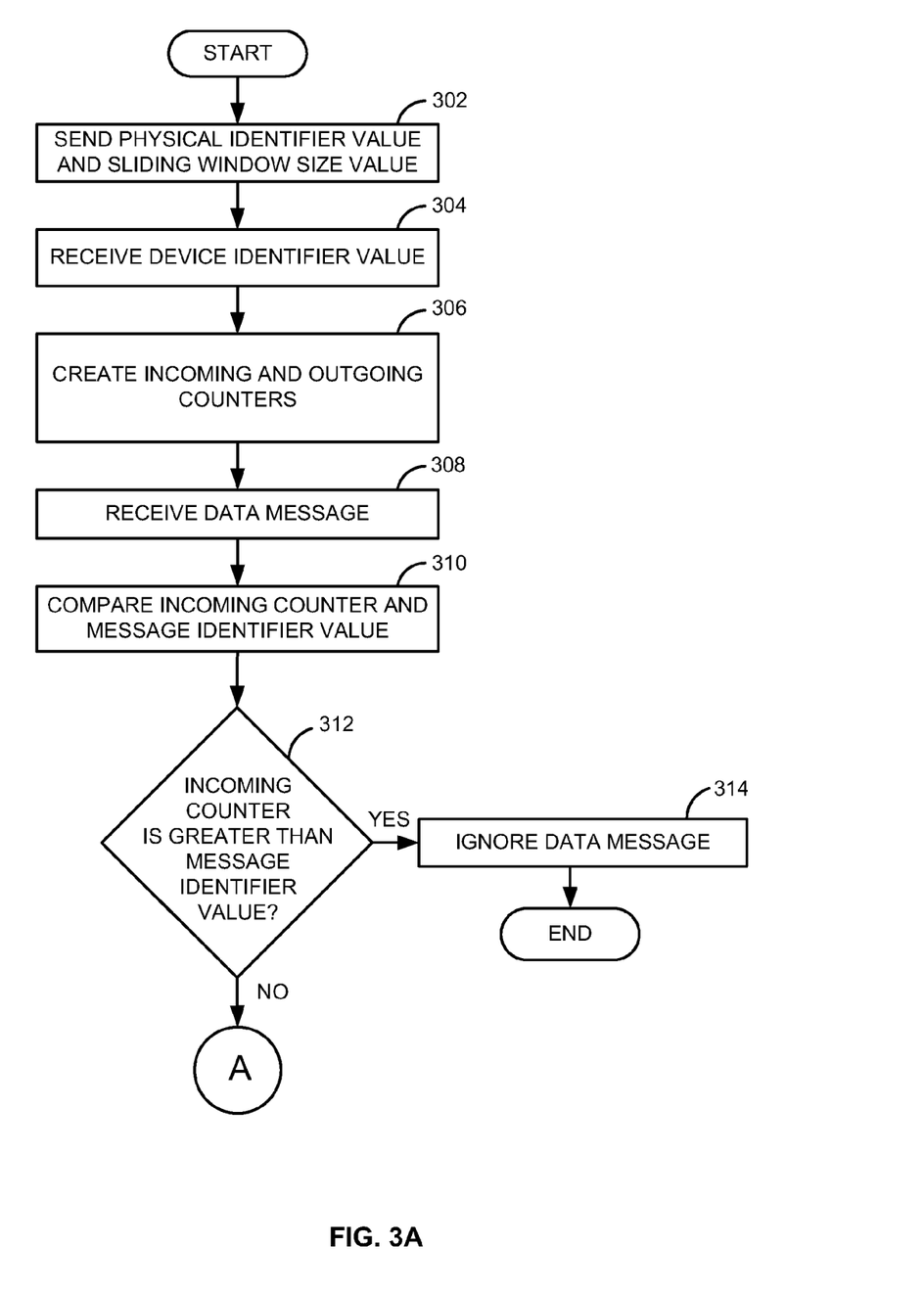
FIG. 3A is a flow diagram illustrating a method for reliable data message exchange at a client side according to various embodiments.

FIG. 3A is a flow diagram illustrating a first part of a method for reliable messaging at a client side according to various embodiments. In various embodiments, the process as described in FIG. 3 may be performed by components as described in FIGS. 1 and 2. Referring to FIG. 3A, at process block 302, a physical identifier value and a sliding window size value are sent from the client to the server. The physical identifier value may be used by a client (e.g., client 102 in FIG. 1) to identify itself as a device on a network. The sliding window size represents the maximum number of messages that may be sent at any given time without acknowledgement by the client that the previously sent out messages were received successfully. A device identifier value is then received by the server, as in process block 304, which indicates that the client has successfully registered itself in the network.

At process block 306, two counters are initialized. One counter is for incoming data messages and one is for outgoing data messages. After receiving a data message, at process block 308, the client compares the message identifier value with respect to the incoming counter, at process block 310.

This is so that the client may determine whether to accept, reject, or ignore the data message. If the incoming counter is greater than the message identifier value, at process block 312, then the data message is ignored, such as in block 314. It is presumed that the data message has already been received. Otherwise, another comparison may be made, at process block 316.

Figure 3B:
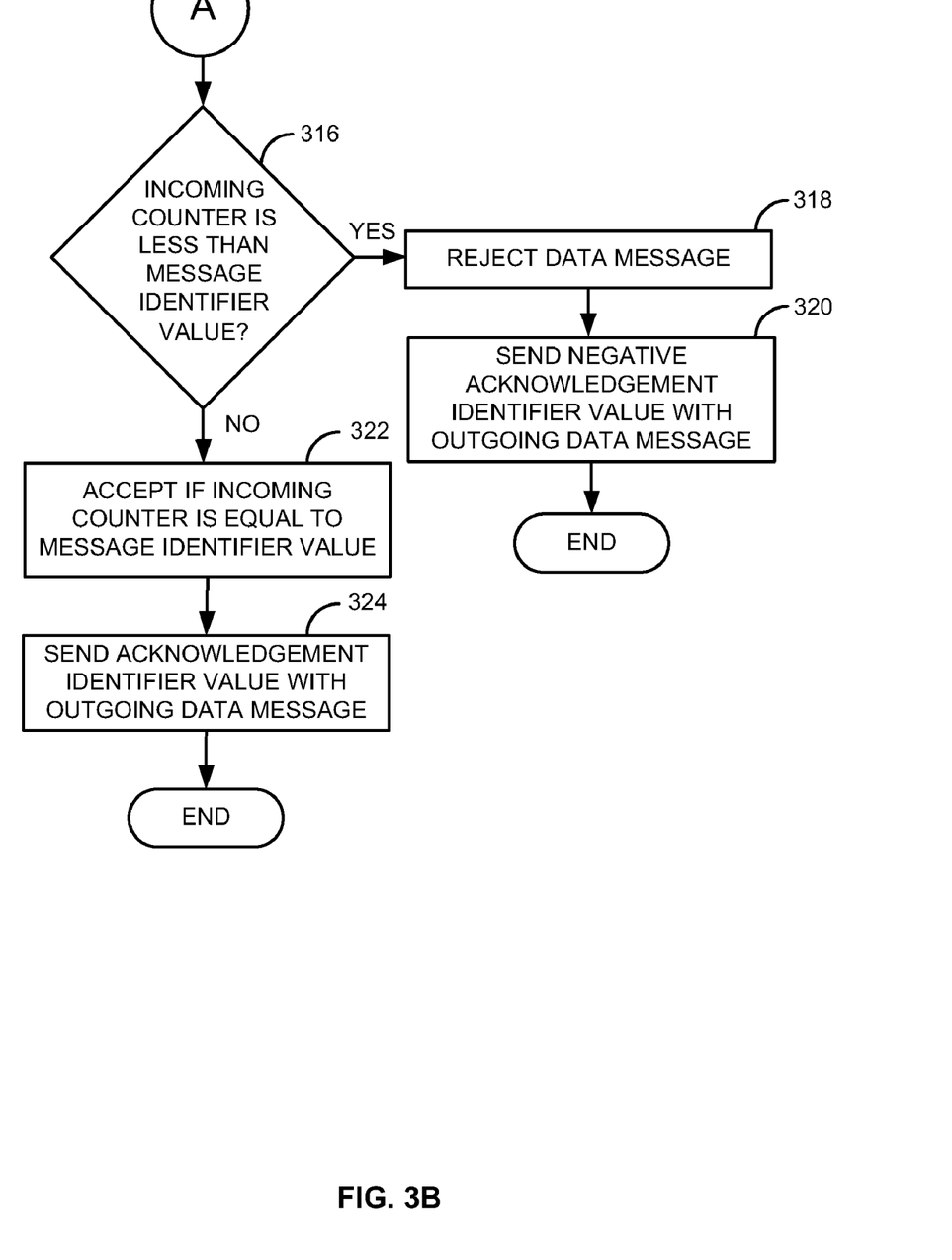
FIG. 3B is a flow diagram illustrating a method for reliable data message exchange at a client side according to various embodiments.

FIG. 3B is a flow diagram illustrating a second part of a method for reliable messaging at a client side according to various embodiments. In various embodiments, the process as described in FIG. 3 may be performed by components as described in FIGS. 1 and 2. Referring to FIG. 3B, at process block 318, if the incoming counter is less than the message identifier value at block 316, the incoming data message is rejected and a negative acknowledgment identifier value is sent with the next outgoing data message, at process block 320. This is to indicate that the message has not been received and is awaiting a retransmission. At process block 322, the data message is accepted if the incoming counter is equal to the message identifier value. Once accepted, at process block 324, the client may then send out an acknowledgement identifier value with the next outgoing data message, and then increment the outgoing counter by one. In various embodiments, an acknowledgement identifier may be sent per a number of messages, or per a number of messages received over a period of time.

Figure 4:
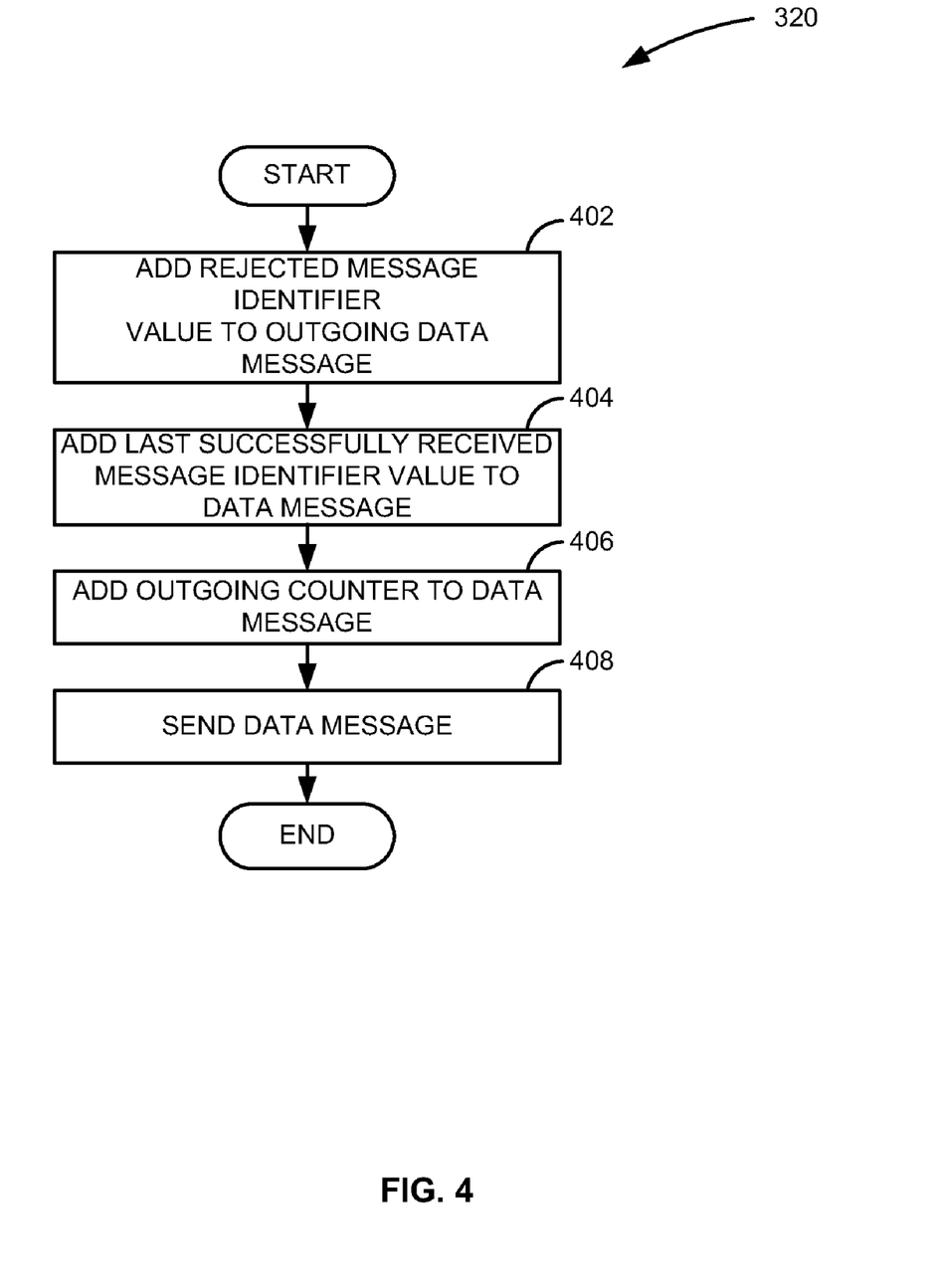
FIG. 4 is a flow diagram illustrating a method for sending negative acknowledgements at a client side according to various embodiments.

FIG. 4 is a flow diagram illustrating a method for sending negative acknowledgements at a client side according to various embodiments. In various embodiments, the process as described in FIG. 4 may be associated with process block 320 of FIG. 3B. In various embodiments, the process described in FIG. 4 may be performed by components described in FIGS. 1 and 2. Referring to FIG. 4, at process block 402, a rejected identifier value is added to the outgoing data message (e.g., to acknowledgement identifier value 206 of FIG. 2). The value may be information about the lost or out of sequence message that was not received. In process block 404, the last successfully received message identifier value is also added to the data message (e.g., to message identifier value 204 of FIG. 2). This value is determined by subtracting one from the outgoing counter. The client adds the outgoing counter to the data message at block 406 (e.g., to data message 202 of FIG. 2) and then sends out the data message at 408.

Figure 5A:
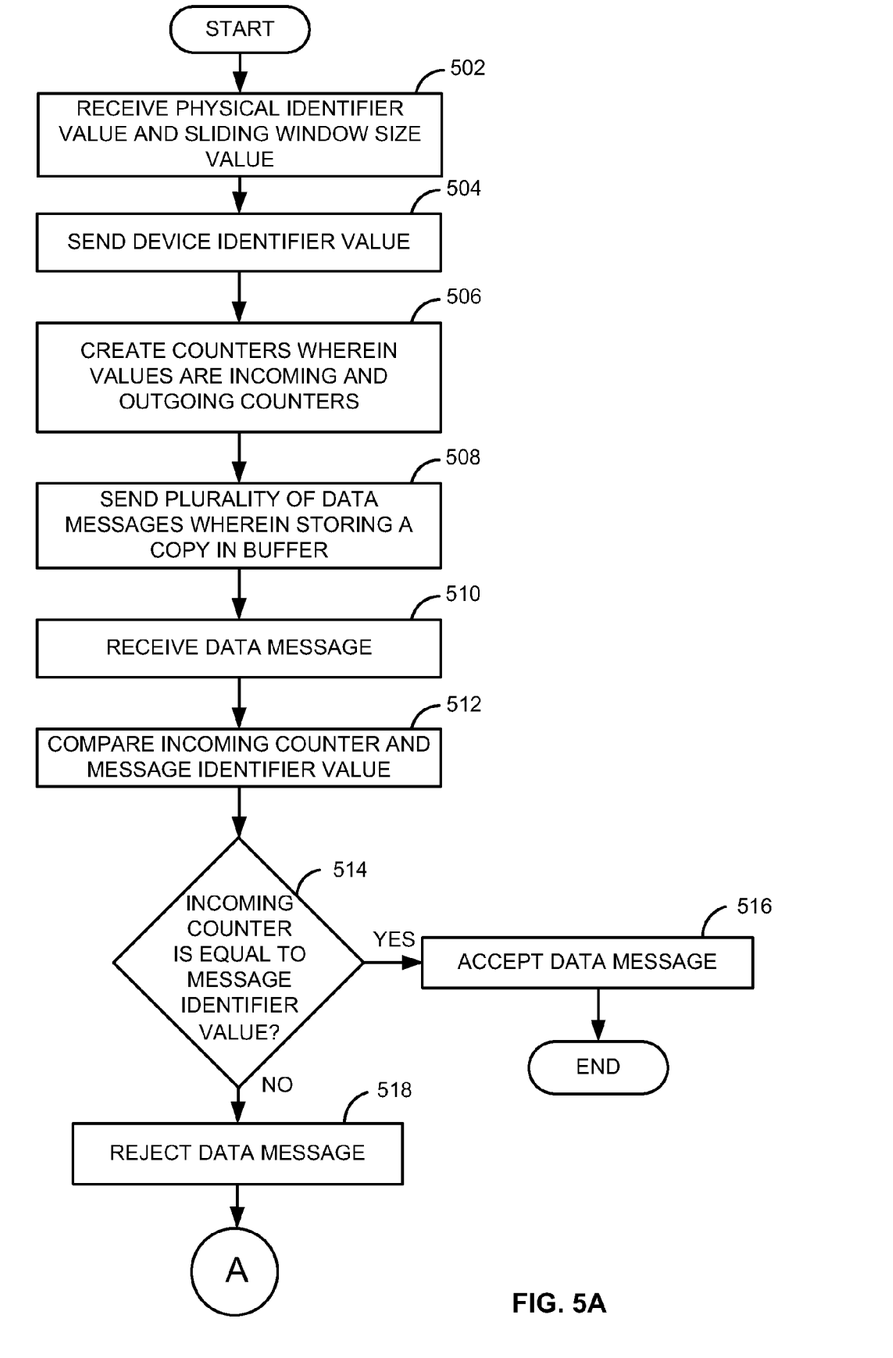
FIG. 5A is a flow diagram illustrating a method for reliable data message exchange at a server side according to various embodiments.

FIG. 5A is a flow diagram illustrating a first part of a method for reliable messaging at a server side according to various embodiments. In various embodiments, the process as described in FIG. 5 may be performed by components as described in FIGS. 1 and 2. Referring to FIG. 5A, at process block 502, the server receives a physical identifier value and a sliding window size value from the client. At process block 504, a device identifier value is sent to the client to indicate that the client has successfully registered itself on the network.

At process block 506, two counters are initialized. One counter is for incoming data messages and one is for outgoing data messages. At block 508, a plurality of data messages are sent, while simultaneously storing a copy of the data messages in a buffer. After receiving a data message at process block 510, the server compares the message identifier value to the incoming counter at block 512. At block 514, a comparison is made between the incoming counter and that of the message identifier value. A data message is accepted at process block 516 if at process block 514 the incoming counter is equal to the message identifier value. If at process block 514 the incoming counter is not equal to the message identifier value, a data message is rejected at process block 518 and another comparison may be made at process block 520.

Figure 5B:
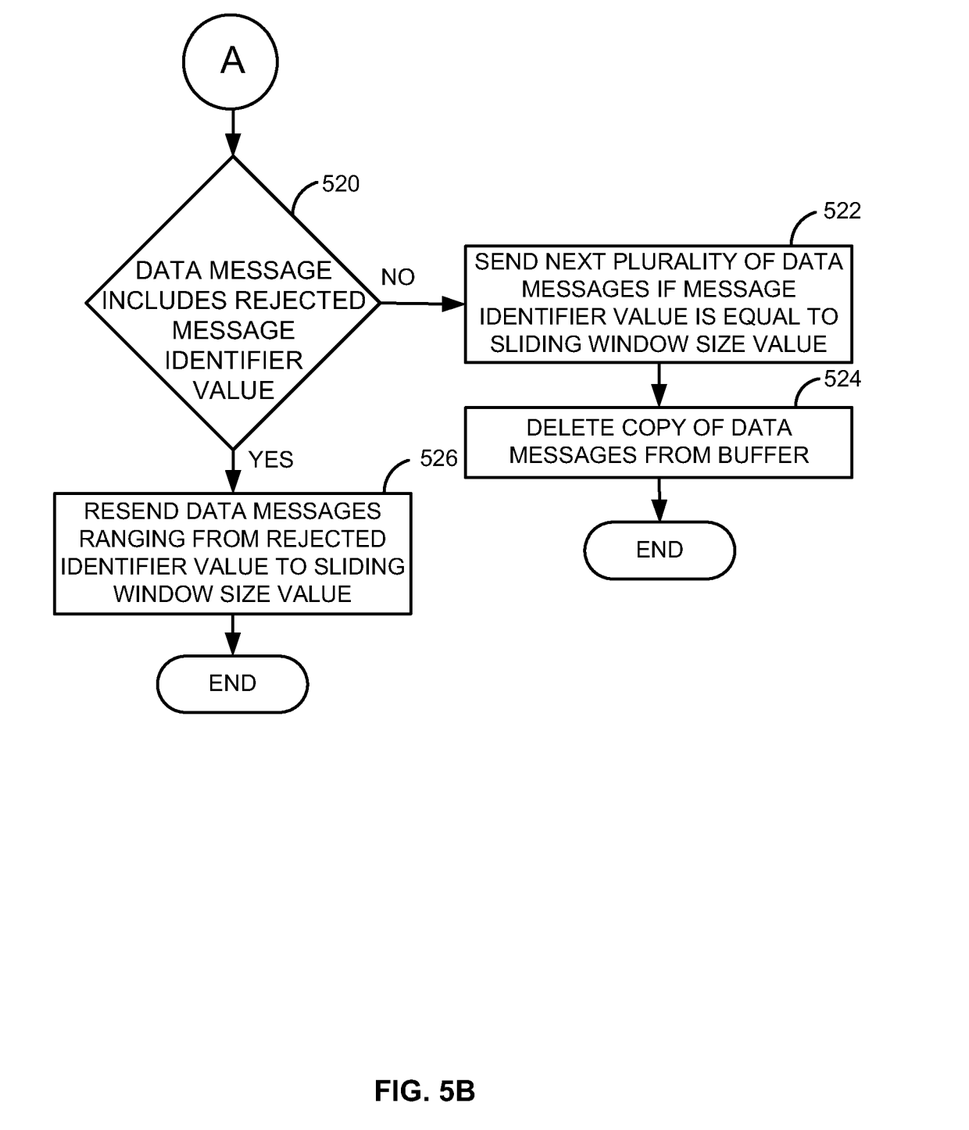
FIG. 5B is a flow diagram illustrating a method for reliable data message exchange at a server side according to various embodiments.

FIG. 5B is a flow diagram illustrating a second part of a method for reliable messaging at a server side according to various embodiments. In various embodiments, the process as described in FIG. 5B may be performed by components as described in FIGS. 1 and 2. Referring to FIG. 5B, if at process block 520 an accepted data message does not include a rejected identifier value the next plurality of data messages are sent when the message identifier value is equal to the sliding window size value at process block 522. The stored copy of data messages are then deleted from the buffer at block 524. If at block 520 an accepted data message includes a rejected identifier value, the server resends data messages with identifiers ranging from the rejected identifier value to the sliding window size value at block 526.

Figure 6:
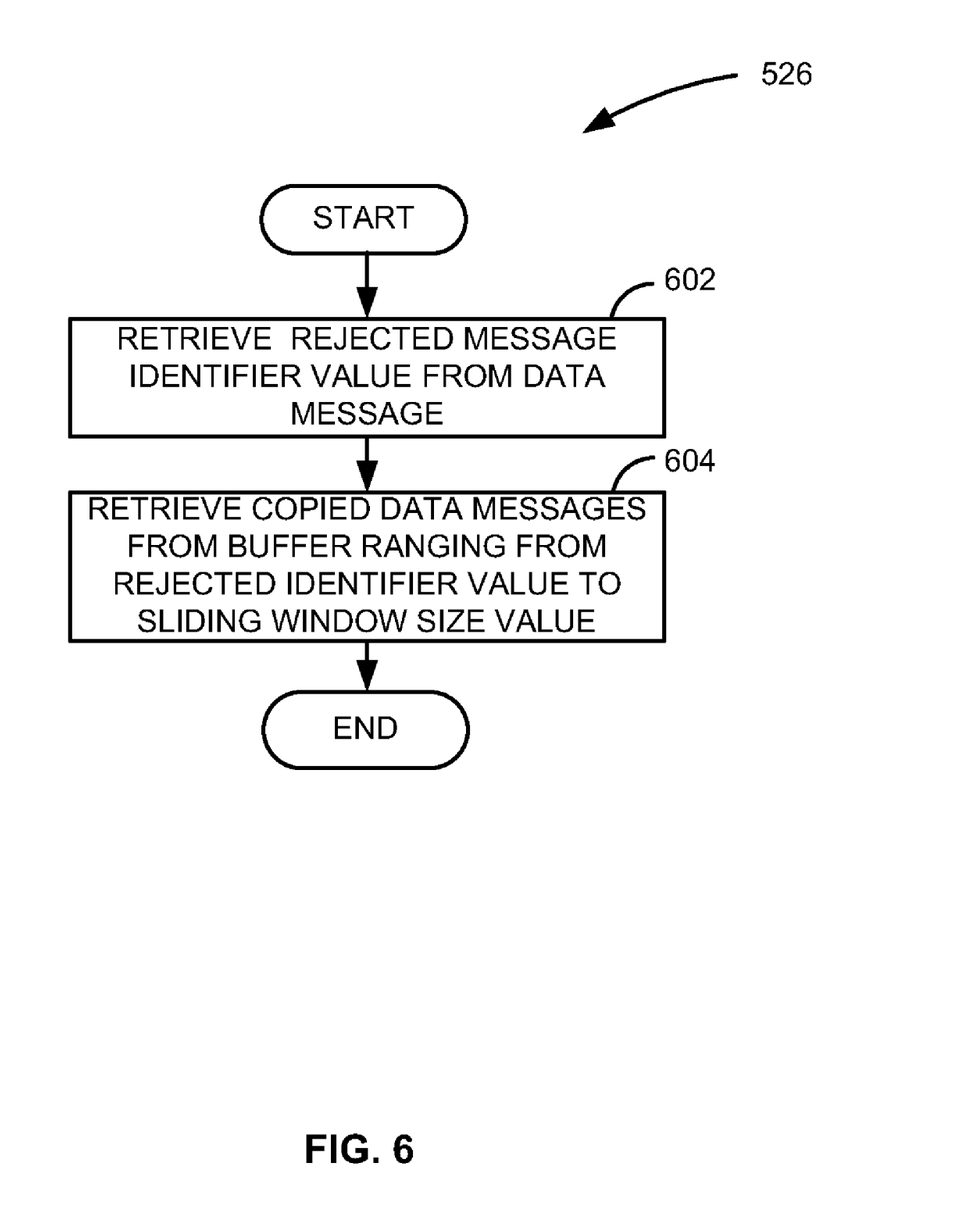
FIG. 6 is a flow diagram illustrating a method for resending a plurality of data messages at a server side according to various embodiments.

FIG. 6 is a flow diagram illustrating a method for resending a plurality of data messages at the server side according to various embodiments. In various embodiments, the process as described in FIG. 6 may be associated with process block 526 of FIG. 5B. In various embodiments, the process described in FIG. 6 may be performed by components described in FIGS. 1 and 2. Referring to FIG. 6, at process block 602, a rejected identifier value is retrieved, indicating which data messages have been lost or are out of sequence. The copied data messages ranging from the rejected identifier value to the sliding window size value are retrieved from the buffer at process block 604.

In one embodiment, data message exchange described above can be further explained. In an enterprise computing system running business software, a Customer Relationship Management (CRM) system may be configured to use such a reliable messaging protocol. The CRM system may maintain sales data in various types of storage and may implement business logic in business objects. The CRM system may run on a server and various client devices such as mobile devices that may communicate with the CRM system on the server using messages.

For example, a sales representative is returning home from a business trip. After performing a successful sales transaction, the sales representative decides to add customer information along with the products sold and total costs from his mobile phone, rather than waiting to get into the office. The sales representative would load his CRM application on his mobile phone and log onto the server. After retrieving a list of accounts he creates a new account for his client. Once the account is created, all relative data pertaining to the sales transaction will be entered in the mobile application and sent to the server where it is stored for later use. Thus, the business data is transferred from the server to a client using data messages.

In various embodiments, a reliable data message exchange such as the reliable data message exchange described herein may have a number of benefits. For example, a benefit is the ability to acknowledge data messages in bulk. Data messages are constantly being published by the server. An acknowledgement may be sent out by the client for a specified range of data messages instead on acknowledging individual data messages. This allows the client to optimize data transmissions and reduce communication to the server. By optimizing data transmission, the device uses less CPU, thus conserving battery life of the mobile device. Also by optimizing data transmission the client also guarantees data message reliability and in sequence data message transfer. Furthermore, data messages that need to be resent due to being lost or out of sequence are stored on the server side. The client may have limited storage space and processing power, so the lost or out of sequence data messages may not be required to be stored and processed at a later time by the client.

The introduction of the sliding window size for the data transmissions is used so that the server does not overload the client with data messages. For example, when the mobile device is not in network range the server will stop transmitting data messages once the sliding window size has been reached. This allows bandwidth optimization by waiting for an acknowledgement by the client before sending more data messages. The sliding window size also eliminates the building up of a queue of data messages for the client to cache and process, which also decreases load on the client's hardware (e.g. CPU, local disk, battery, etc. . . . ).

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
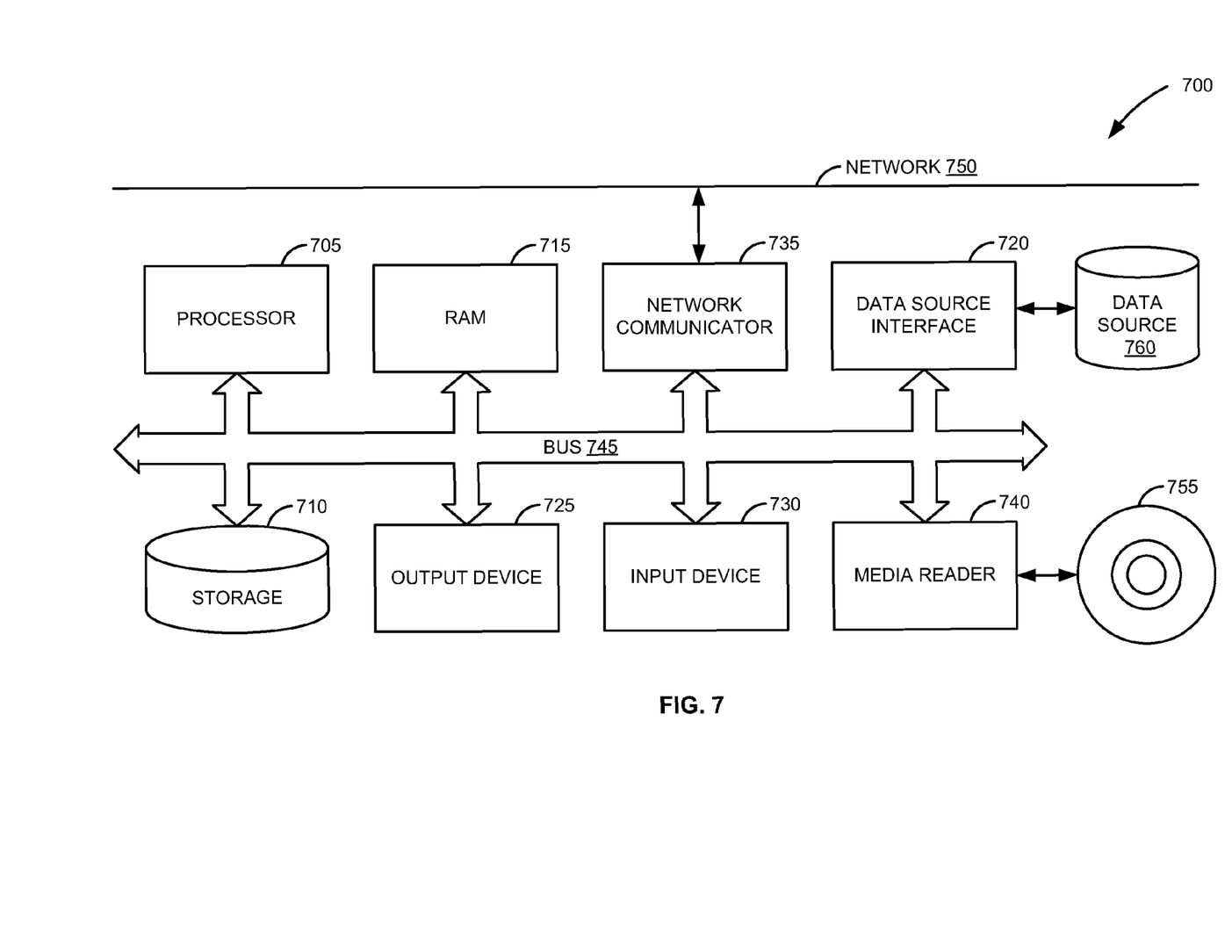
FIG. 7 is a block diagram of an exemplary computer system according to various embodiments.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable storage medium having computer readable instructions tangibly stored thereon which when executed by a computer, cause the computer to perform a method for reliable data message exchange between a client and a server network, the method comprising:
    performing a handshake comprising a registration process for allowing exchange of data messages and providing a sliding window size value;
    initializing an incoming counter to maintain a first incremental numerical value for a next message to be received;
    receiving a data message;
    comparing a value of the incoming counter to a message identifier value of the data message;
    accepting the data message if the value of the incoming counter is equal to the message identifier value of the data message; and
    sending an acknowledgement identifier value in an outgoing data message upon receipt of the data message if the data message is the last of the sliding window size value.

2. The computer readable storage medium of claim 1, wherein providing the sliding window size value comprises sending a value for a maximum number of data messages to be exchanged without acknowledgement.

3. The computer readable storage medium of claim 1, wherein sending the acknowledgement identifier value in the outgoing data message upon receipt is initialized by implementing a time based or message count based event to send out acknowledgment receipts.

4. The computer readable storage medium of claim 1, wherein the handshake further comprises:
    sending a physical identifier value to be identified over the network; and
    receiving a device identifier value to enable data message exchanges.

5. The computer readable storage medium of claim 1, wherein the method further comprises initializing an outgoing counter to maintain a second incremental numerical value for a next message to be sent.

6. The computer readable storage medium of claim 1, further comprising:
    rejecting the data message if the incoming counter is less than the message identifier value of the data message; and
    sending a negative acknowledgement identifier value with a negative outgoing data message, wherein the negative outgoing data message specifies that the data message is waiting for a retransmission.

7. The computer readable storage medium of claim 6, wherein sending the negative acknowledgement identifier value comprises:
    adding a rejected identifier value of the data message to the negative outgoing data message;
    adding a message identifier value of a last successfully received data message to the negative outgoing data message; and
    sending the negative outgoing data message.

8. A computer implemented method for reliable data message exchange between a client and a server in a network, the method comprising:
    performing a handshake comprising a registration process for allowing exchange of data messages and providing a sliding window size value;
    initializing an incoming counter to maintain a first incremental numerical value for a next message to be received;
    receiving a data message;
    the server, comparing a value of the incoming counter to a message identifier value of the data message;
    accepting the data message if the value of the incoming counter is equal to the message identifier value of the data message; and
    sending an acknowledgement identifier value in an outgoing data message upon receipt of the data message if the data message is the last of the sliding window size value.

9. The method of claim 8, wherein providing the sliding window size value comprises sending a value for a maximum number of data messages to be exchanged without acknowledgement.

10. The method of claim 8, wherein sending the acknowledgement identifier value in the outgoing data message upon receipt is initialized by implementing a time based or message count based event to send out acknowledgment receipts.

11. The method of claim 8, wherein the handshake further comprises:
    sending a physical identifier value to be identified over the network; and
    receiving a device identifier value to enable data message exchanges.

12. The method of claim 8, the method further comprising initializing an outgoing counter to maintain a second incremental numerical value for a next message to be sent.

13. The method of claim 8, further comprising:
    rejecting the data message if the incoming counter is less than the message identifier value of the data message; and
    sending a negative acknowledgement identifier value with a negative outgoing data message, wherein the negative outgoing data message specifies that the data message is waiting for a retransmission.

14. The method of claim 13, wherein sending the negative acknowledgement identifier value comprises:
    adding a rejected identifier value of the data message to the negative outgoing data message;
    adding a message identifier value of a last successfully received data message to the negative outgoing data message; and
    sending the negative outgoing data message.

15. A computer system for reliable data message exchange between a client and a server in a network, the system comprising:
    a memory within the server to store computer executable instructions; and
    a processor coupled to the memory and operable to execute the instructions to:

perform a handshake comprising a registration process for allowing exchange of data messages and provide a sliding window size value;

initialize an incoming counter to maintain a first incremental numerical value for a next message to be received;

receive a data message;

compare a value of the incoming counter to a message identifier value of the data message;

accept the data message if the value of the incoming counter is equal to the message identifier value of the data message; and send an acknowledgement identifier value in an outgoing data message upon receipt of the data message if the data message is the last of the sliding window size value.

16. The system of claim 15, wherein providing the sliding window size value comprises sending a value for a maximum number of data messages to be exchanged without acknowledgement.

17. The system of claim 15, wherein sending the acknowledgement identifier value in the outgoing data message upon receipt is initialized by implementing a time based or message count based event to send out acknowledgment receipts.

18. The system of claim 15, wherein the processor is further operable to execute instructions to:

send a physical identifier value to be identified over the network;

receive a device identifier value to enable data message exchanges; and initialize an outgoing counter to maintain a second incremental numerical value for a next message to be sent.

19. The system of claim 15, wherein the processor is further operable to execute instructions to:

reject the data message if the incoming counter is less than the message identifier value of the data message; and send a negative acknowledgement identifier value with a negative outgoing data message, wherein the negative outgoing data message specifies that the data message is waiting for a retransmission.

20. The system of claim 19, wherein the instructions to reject the data message and send the negative acknowledgement identifier value further comprise instructions to:

add a rejected identifier value of the data message to the negative outgoing data message;

add a message identifier value of a last successfully received data message to the negative outgoing data message; and send the negative outgoing data message.

* * * * *